United States Patent [19]
Kochanski et al.

[11] Patent Number: 5,838,118
[45] Date of Patent: *Nov. 17, 1998

[54] DISPLAY APPARATUS WITH COATED PHOSPHOR, AND METHOD OF MAKING SAME

[75] Inventors: Gregory Peter Kochanski, Dunellen; Cherry Ann Murray, Murray Hill; Michael Louis Steigerwald, Martinsville; Pierre Wiltzius, Millington, all of N.J.; Alfons van Blaaderen, Utrecht, Netherlands

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 623,201

[22] Filed: Mar. 28, 1996

[51] Int. Cl.$^6$ .............................. H01J 31/20; B05D 5/06
[52] U.S. Cl. ......................... 315/326; 313/489; 428/690
[58] Field of Search .................. 313/486, 489, 313/503, 635, 463; 428/690, 209, 404; 315/326, 363, 76, 111.01

[56] References Cited

U.S. PATENT DOCUMENTS

| | | | |
|---|---|---|---|
| 4,513,025 | 4/1985 | Clark et al. | 427/68 |
| 5,185,207 | 2/1993 | Furuoka et al. | 428/404 |

OTHER PUBLICATIONS

"Handbook of Display Technology", Academic Press, New York 1992, pp. 32–33, 37–50, 123–125 and 253–257.

"Quantitative Electron Spectroscopy of Surfaces", by M.P. Seah and W. A. Dench, *Surface and Interface Analysis*, vol. 1 (1), pp. 2–11 (1979).

*Primary Examiner*—Robert J. Pascal
*Assistant Examiner*—David H. Vu
*Attorney, Agent, or Firm*—Eugen E. Pacher; Julio A. Garceran

[57] ABSTRACT

Coating phosphor (typically particles) with a thin layer of Si, Ti, Al, Zr, In or Sn-containing material can result in significantly improved lifetime of the phosphor. A preferred coating technique involves exposing the phosphor to an alkoxide (e.g., TEOS) solution having ph>7, preferably >9 or 10.

9 Claims, 3 Drawing Sheets

DISPLAY APPARATUS WITH COATED PHOSPHOR, AND METHOD OF MAKING SAME

FIELD OF THE INVENTION

The invention pertains to "phosphor" for e.g., electron beam display apparatus, and to a method of making the phosphor.

BACKGROUND OF THE INVENTION

Display apparatus that involves cathodoluminescence of substances that are usually referred to as "phosphors" is nearly ubiquitous, including conventional cathode ray tubes in television sets, computer monitors, radar screens etc., and also relatively new field emission displays. For background see, for instance, J. A. Costellano, "Handbook of Display Technology", Academic Press, New York 1992, especially pages 32–33, 37–50, 123–125, and 253–257. Phosphors are also found in non-display apparatus, e.g., in fluorescent lights.

Despite the maturity of cathode ray tube (CRT) technology, the technology of cathodoluminescent (CL) displays still has shortcomings. In particular, the operating lifetime of CRTs is typically limited by electron-induced damage to the phosphor, with impinging electrons creating defects in the phosphor that cause non-radiative recombination of electrons and holes, thus reducing the number of charge carriers that produce light.

There are known phosphors that have adequate operating lifetimes for most applications at relatively high voltages. However, existing phosphors typically do not have sufficient lifetime at relatively low operating voltages.

It would also be advantageous to have available phosphors for field emission displays (FEDs) that can have long operating life at relatively low operating voltage, e.g., at 3000 V or below. FEDs that operate at 3000 V or below can be constructed relatively simply and inexpensively. Unfortunately, prior art phosphor screens typically only have adequate operating lifetime at 5000 V or above, making the construction of FEDs relatively difficult and costly. Even at high voltages, increased operating life would be advantageous. For instance, television monitors displaying airport flight information need to be replaced frequently because typically they are operated at high brightness and with nearly stationary images that become "burned" into the phosphor screen.

In view of the above remarks, it would clearly be desirable to have available a phosphor that can provide adequate lifetime (comparable to the lifetime of prior art phosphors at 5000 V) at 3000 V or below. More generally, it would be desirable to have available phosphors that are relatively resistant to deterioration under particle bombardment. This application discloses such phosphors, and a method of making the phosphors.

SUMMARY OF THE INVENTION

In one aspect the invention is embodied in improved apparatus, exemplarily CL display apparatus. The display apparatus comprises at least one cathode, at least one anode spaced from the cathode and comprising CL material disposed facing the cathode, and means for applying a voltage $V_{op}$ between the cathode and the anode such that electrons are emitted from the cathode, are accelerated and impinge on the CL material such that light is emitted from said CL material. Significantly, the CL material comprises X-containing material of thickness selected such that at least a substantial portion of the accelerated electrons can penetrate through the X-containing material and cause light emission from the CL material, wherein X is selected from the group consisting of Si, Ti, Al, Zr, In and Sn. The CL material can be in the form of a layer of particles, but can also be in the form of a substantially uniform layer. In the former case the X-containing material at least substantially coats the particles, and in the latter case the X-containing material will typically be a thin layer disposed on the uniform CL material layer.

A further exemplary embodiment of the invention is apparatus that comprises CL material that is, during operation of the apparatus, exposed to bombardment by energetic photons (typically UV) and/or particles (e.g., electrons, protons, ions), collectively "actinic radiation". The CL material comprises particles that are substantially coated with X-containing material, where X is selected from the group consisting of Si, Ti, Al, Zr, In and Sn.

In a still further aspect the invention is embodied in a method of making the coated CL material, the method comprising exposing the CL material to an alkoxide solution having pH>7.

DETAILED DESCRIPTION OF SOME EMBODIMENTS

The discussion below will primarily be in terms of particulate PL materials. However, the invention is not so limited, and coated thin films of CL material are also contemplated. Furthermore, the use of the terms "CL material" or "cathodoluminescent material" does not imply that the invention is restricted to apparatus that involves bombardment by electrons, and the terms are intended to collectively refer to material that can emit electromagnetic (typically visible) radiation upon exposure to actinic radiation (e.g., electrons, protons, ions, or photons).

Figure 1:
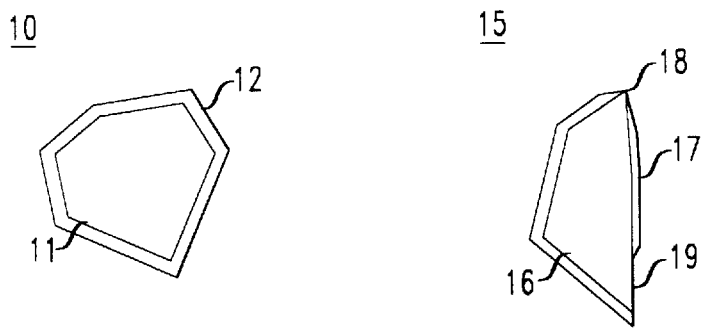
FIG. 1 schematically shows two coated particles of CL material.

We have made the surprising discovery that the lifetime of CL materials can be improved if the CL material is substantially covered with a thin layer of non-CL material. In currently preferred embodiments the non-CL material layer comprises one or more of Si, Ti, Zr and Al. Such layers are currently preferred because they can be formed relatively easily, inexpensively and with relatively good thickness control. However, layers that contain other elements may also be operative. Among these are layers that contain In and/or Sn. These elements can form conductive oxides. The presence of a conductive layer can result in reduced charge accumulation of the CL material under electron bombardment. FIG. 1 schematically depicts two exemplary substantially coated phosphor particles according to the invention, wherein numeral 10 refers to a particle that is coated with a layer 12 of substantially uniform thickness, and numeral 15 refers to a particle 16 that is substantially coated with layer 17, with (desirably minor) portions of the surface of 16 (e.g., 18, 19) being inadvertently uncoated.

The details of the mechanism by which coatings according to the invention increase phosphor lifetime is currently not fully understood. However, it is believed that the coatings prevent or diminish preferential depletion of one (or possibly more) atomic species from the near-surface region of the phosphor. Such depletion changes phosphor composition and results in lower efficiency.

Figure 2:
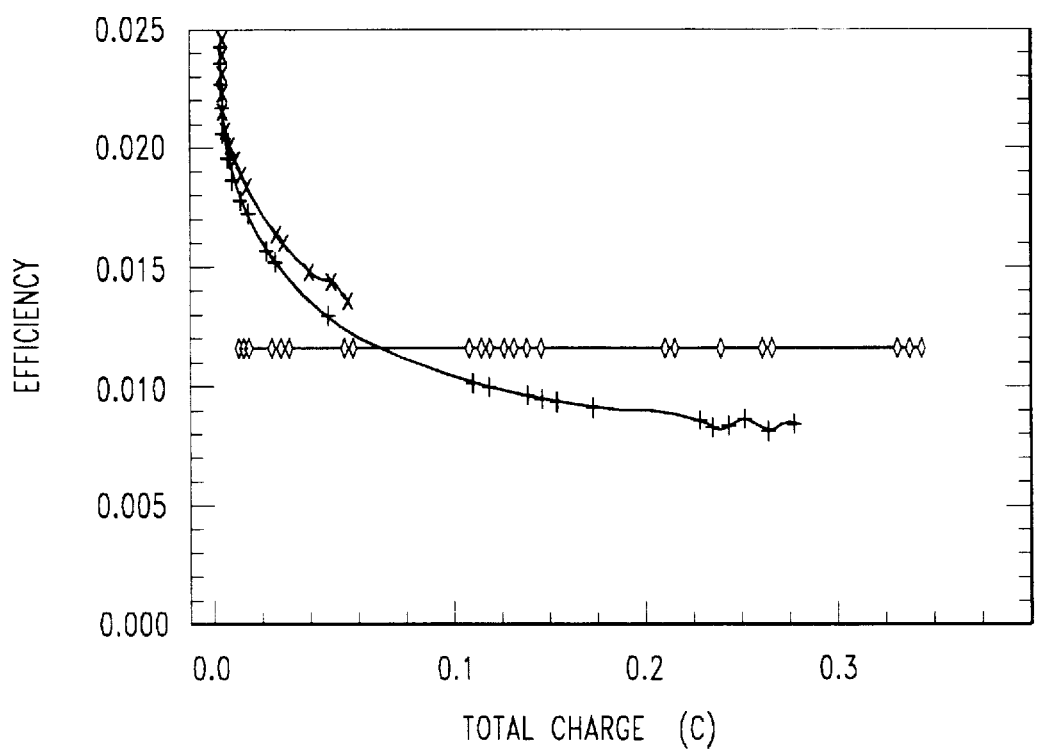
FIG. 2 shows exemplary data of luminous efficiency vs. charge for coated ZnS particles according to the invention and for uncoated prior art ZnS particles.

FIG. 2 exemplifies the improved phosphor characteristics that can be obtained. The figure shows data on efficiency vs. total charge deposited on the phosphor, at an operating voltage of 1500 V. The charge was deposited over an area of about 3 mm$^2$. Because the charge deposition rate was approximately constant in time, FIG. 2 can be considered to represent efficiency vs. time. "Efficiency" herein generally is proportional to the ratio of output power/input power, where output power is light power. Curve 21 pertains to coated phosphor (ZnS) according to the invention, and curve 20 to the corresponding uncoated prior art phosphor. The efficiency of the uncoated phosphor is initially high, but rapidly drops below the efficiency of the coated phosphor. The improvement in efficiency for charge above about 0.1 C is evident. Substantial elimination of the decrease in efficiency with increasing charge typically translates into increased phosphor lifetime. The phosphor particles according to the invention were coated with Si-containing material.

Figure 3:
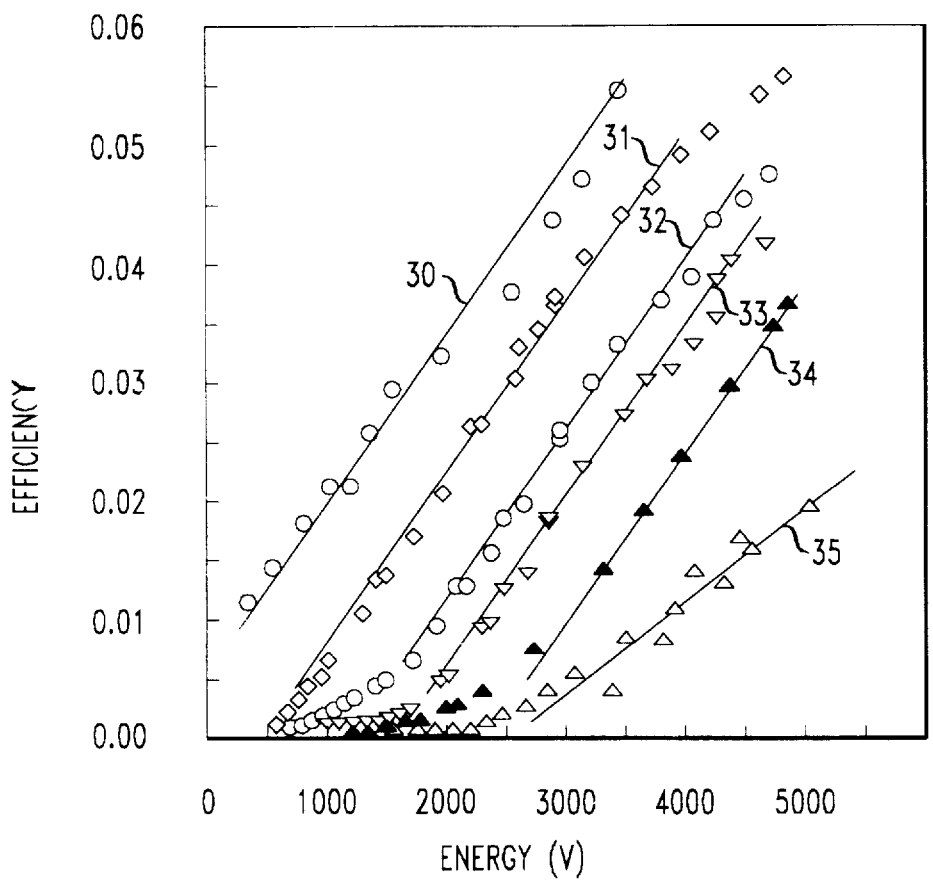
FIG. 3 presents exemplary data of luminous efficiency of coated and uncoated ZnS/Cu phosphor as a function of operating voltage, for various coating thicknesses.

FIG. 3 shows data on the relative efficiency of ZnS:Cu phosphor versus electron energy, for various thicknesses of the Si-containing coating. The data correspond to the initial efficiency, before enough charge was deposited to substantially degrade the phosphor. Straight lines are drawn through the data points merely as an aid to the viewer. Curve 30 pertains to uncoated ZnS:Cu particles, and curves 31–35 pertain to corresponding coated particles, with coating thickness increasing from 31 to 35. As will be noticed, the emission threshold voltage increases with increasing coating thickness. This is readily understandable, since the electron energy needed to penetrate through the coating into the phosphor particle increases with increasing coating thickness. Typically the electron penetration thickness (i.e., the thickness at which half of the incident electrons penetrate the thickness of material) increases approximately as the 1.6 power of the incident energy.

As a consequence of the energy dependence of the penetration depth, the desirable coating thickness range of phosphors depends on the intended operating voltage of the display or other phosphor-containing device. The lower limit of the thickness typically is selected such that the coating substantially prevents loss of material from the phosphor. A substantially uniform thickness of 1 nm will frequently be sufficient to prevent material loss.

The upper thickness limit will typically be selected such that the phosphor exhibits adequate efficiency (radiation power emitted/excitation power) at the intended operating voltage. For some applications, an efficiency half that of the uncoated phosphor may be an adequate efficiency. The upper thickness limit can also be expressed in terms of the inelastic mean free path of the actinic radiation (typically electrons) in the coating material, with an average thickness of about 3 inelastic mean free paths being currently preferred. Typically the average coating thickness will be at most 6 inelastic mean free paths in the coating material. For Si-containing coating, 3 inelastic mean free path lengths correspond to 3.6, 6.6 and 11.4nm for 300, 1000 and 3000 Volts electron energy, respectively. For quantitative information on electron mean free paths in solids see, for instance, M. P. Seah and W. A. Dench, *Surface and Interface Analysis*, Vol. 1(1), p. 2 (1979).

As will be described in more detail below, coating thickness can be readily varied by changing the alkoxide concentration in the coating medium. For instance, curves 31–35 of FIG. 3 are related by the fact that the TEOS (tetraethoxiorthosilicate) concentration in the coating medium increased in steps of ×5 from curve 31 to 35. It is thus an easy matter to find an acceptable (or even optimum) value of coating thickness for an intended application by a simple trial and error approach, guided by the information provided herein.

An important aspect of the instant invention is our discovery of a simple and economical method of coating the phosphor, typically phosphor particles. Desirably a method of coating phosphor particles can provide functionally substantially complete coverage of the particles, and also gives control over coating thickness. Those skilled in the art will recognize that conventional coating methods such as sputtering, vapor deposition and chemical vapor deposition generally will not yield substantially complete coverage of, generally irregularly shaped, particles, and are relatively expensive. Another known method, namely deposition from a solution via evaporation of solvent, will typically result in coatings of irregular thickness because surface tension causes the solvent to preferentially accumulate near contact areas between grains, resulting in relatively thick deposits of solute near contact areas, and relatively thin deposits elsewhere. A still further known method, namely, deposition by sublimation of a plastic matrix containing low-vapor pressure materials has similar difficulties with deposit thickness uniformity.

In a particular and currently preferred embodiment the phosphor particles are coated by means of a base-catalyzed hydrolysis reaction of an inorganic alkoxide (e.g., tetraethoxiorthosilicate or TEOS) that produces reactive monomers that condense and cover available surfaces with an inorganic-oxide-based layer.

Figure 4:
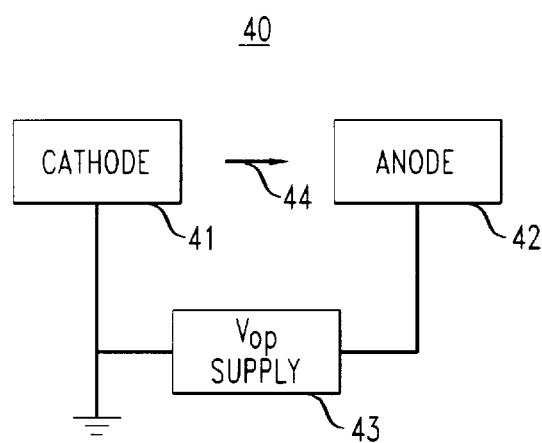
FIG. 4 schematically depicts an exemplary apparatus according to the invention.

FIG. 4 schematically depicts an exemplary light-emitting apparatus 40 according to the invention, wherein numerals 41–44 designate respectively a cathode, anode, $V_{op}$ supply, and electrons that propagate from cathode to anode and impinge on the coated cathodoluminescent material.

EXAMPLE 1

Coated phosphor particles (corresponding to those of curve 34 of FIG. 3) were formed as follows:

0.3 g particulate ZnS phosphor (particle size 17±4 μm), 300 ml ethanol and 25 ml of 30% ammonium hydroxide solution in water were mixed together, followed by addition of 2.33 ml TEOS.. The thus produced basic (pH>10) suspension was stirred for 3 hours. The particulate component was permitted to settle. After settling was substantially complete the liquid component was decanted, and the particulate residue was dried. The thus produced coated phosphor was tested as follows: the coated phosphor particles were distributed uniformly over a stainless steel plate such that the plate was completely covered. The plate was placed into a vacuum chamber, the chamber was evacuated to 10$^{-7}$ torr, followed by bombardment of the coated phosphor with an electron beam incident 60° from the normal to the plate. Light emission was measured by a silicon photodiode, with filters chosen to match the human visual response.

EXAMPLE 2

Coated phosphor particles were formed substantially as described above, except that 0.85 g Y$_2$O$_3$ phosphor (particle size ~4.5 μm) was used, together with 600 ml ethanol, 50 ml NH$_4$OH, and 0.43 ml TEOS. The ratio of TEOS to phosphor surface area was chosen such that the resulting coating thickness would correspond substantially to that of curve 31 of FIG. 3. The resulting coated phosphor particles had an emission threshold voltage of 1200V, with lifetime improvement substantially like that observed with ZnS phosphors.

The invention claimed is:

1. Light-emitting apparatus comprising luminescent material, and means adapted for causing impingement of actinic radiation on said luminescent material;

CHARACTERIZED IN THAT on said luminescent material is disposed an X-containing material, said luminescent material comprises particles of the luminescent material, said particles being substantially coated with said X-containing material of average thickness selected such that at least a substantial portion of said actinic radiation can penetrate through said X-containing material, wherein X is a single member of the group consisting of Si, Ti, Al, Zr, In and Sn.

2. Light-emitting apparatus according to claim 1, wherein said luminescent material comprises particles of the luminescent material, said particles having a coating of said X-containing material of average thickness>1 nm.

3. Light-emitting apparatus according to claim 2, wherein said actinic radiation comprises electrons, the luminescent material is cathodoluminescent material, the means for causing impingement of actinic radiation comprise at least one cathode, at least one anode spaced from the cathode and comprising particles of cathodoluminescent material, and means for applying a voltage $V_{op}$ between the cathode and anode such that electrons are emitted from the cathode and impinge on the coated cathodoluminescent particles.

4. Light-emitting apparatus according to claim 3, wherein $V_{op}$ is at most 3000 volts.

5. Light-emitting apparatus according to claim 3, wherein the average thickness of the X-containing coating is at most six electron inelastic mean free paths at $V_{op}$.

6. Light-emitting apparatus according to claim 5, wherein said average thickness is at most three electron inelastic mean free paths at $V_{op}$.

7. Light-emitting apparatus according to claim 2, wherein X is a member of the group consisting of Si, Ti, Al and Zr.

8. Method of making light-emitting apparatus comprising a luminescent material, the method comprising a) providing a quantity of the luminescent material;

b) contacting said quantity with a coating medium formed by combining an X-containing alkoxide, an alcohol and a base selected to provide said coating medium with a pH>7, the amount of X-containing alkoxide in the coating medium selected to yield an X-containing coating of a desired average thickness on the luminescent material; and c) providing means for causing impingement of actinic radiation on the coating luminescent material.

9. Method according to claim 8, wherein pH>9, and the base is ammonium hydroxide.

* * * * *